March 23, 1971     D. W. JAMES ET AL     3,572,110
TENSION INDICATOR
Filed Nov. 12, 1968     3 Sheets-Sheet 1
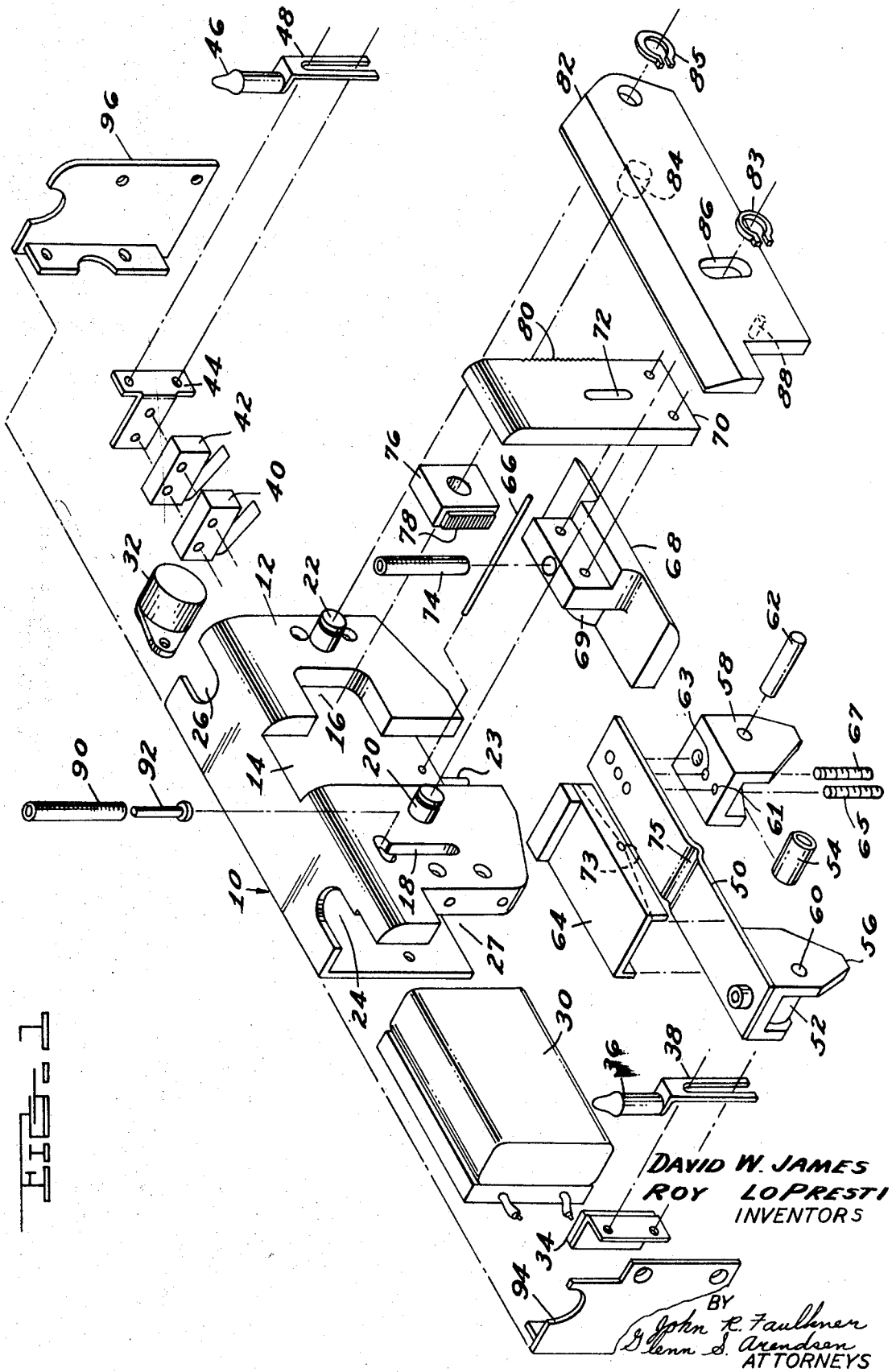
DAVID W. JAMES
ROY LOPRESTI
INVENTORS
BY
John R. Faulkner
Glenn S. Arendsen
ATTORNEYS March 23, 1971 D. W. JAMES ET AL 3,572,110
TENSION INDICATOR
Filed Nov. 12, 1968 3 Sheets-Sheet 2
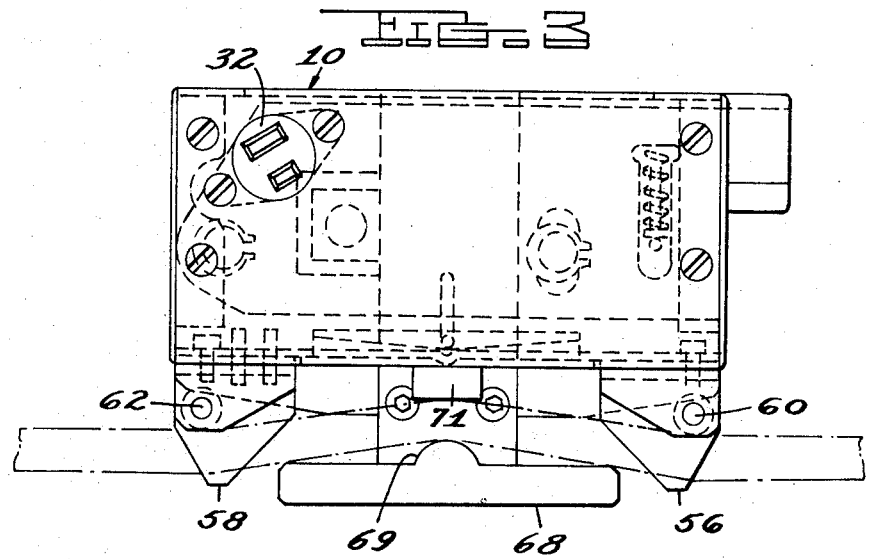
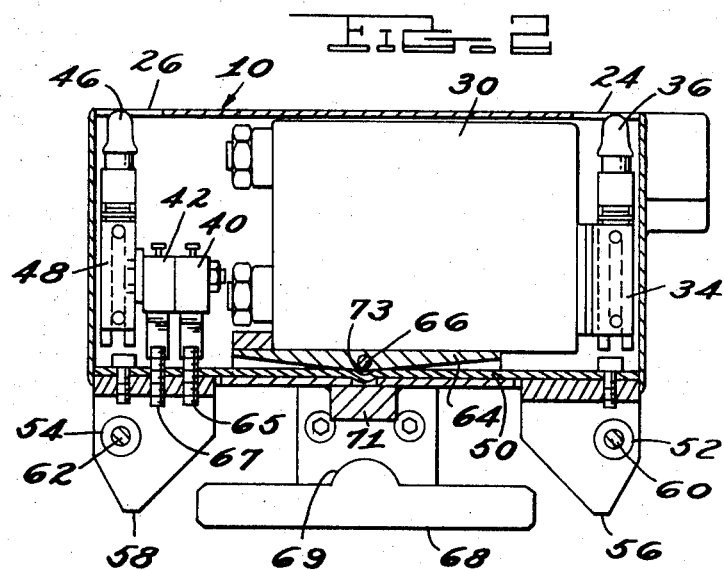
DAVID W. JAMES
ROY LO PRESTI
INVENTORS
BY
John R. Faulkner
Glenn S. Arendsen
ATTORNEYS

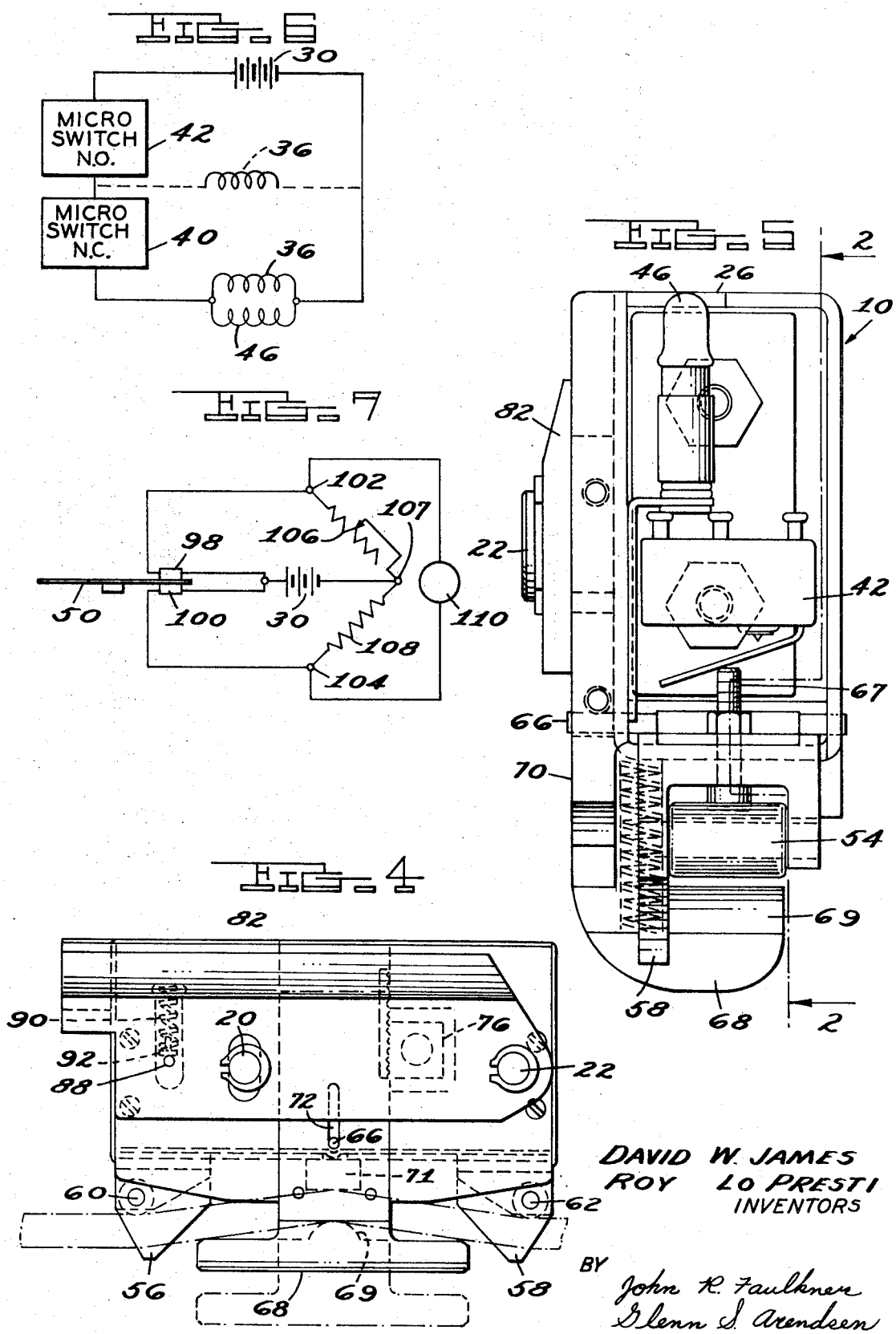

United States Patent Office 3,572,110
Patented Mar. 23, 1971

3,572,110
TENSION INDICATOR
David W. James, Dearborn, Mich., and Roy LoPresti, Chicago, Ill., assignors to Ford Motor Company, Dearborn, Mich.
Filed Nov. 12, 1968, Ser. No. 774,854
Int. Cl. G01l 5/10
U.S. Cl. 73—144
9 Claims

ABSTRACT OF THE DISCLOSURE

The tension in automotive V-belts is indicated by a device that deflects the belt between two rollers fastened to a leaf spring. Two microswitches, one of which is normally closed and the other normally open, are actuated by the resulting deflection of the spring. The microswitches are electrically in series with each other and with a light bulb and the normally open switch is preset to close when a predetermined minimum tension is reached while the normally closed switch is preset to open when a predetermined maximum tension is reached. Thus the light bulb will be turned on when the tension in the belt is within a predetermined range. Quantitative measurements of the tension can be obtained by fastening strain gauges to the spring and connecting the strain gauges through a bridge-type circuit to a meter reading directly in tension units. The tension indicator is operated by hand and contains an efficient latching mechanism for maintaining a predetermined amount of deflection in the belt during measurement.

SUMMARY OF THE INVENTION

The tensions in automobile V-belts used to drive accessories such as alternators, power steering pumps, and air conditioning compressors determine to a large extent the efficiency and operating life of the accessories. An excessively high tension hastens the failure of bearings in the accessories and an excessively low tension induces belt slippage and belt wear. Satisfactory performance usually is obtained with belt tensions falling within a range of ±10 percent of a predetermined value and it is essential to the mass production of automobiles that tension determination be made rapidly and efficiently and in a variety of cramped and poorly lighted locations. Other relatively long flexible members such as guy wires and support cables for construction projects have the same general requirements.

A variety of instruments have been used in the past to measure the tension in V-velts and other flexible members. Probably the most common instrument used in the automobile industry was a device having a pair of handles that were squeezed together to deflect the belt. The resistance to deflection was measured directly on a dial. While this instrument could be operated satisfactorily under carefully controlled and well lighted laboratory conditions, it was unsuitable for the automobile assembly line because of the size of the handles, the difficulty in reading the dial, and the variation in readings resulting from the amount of force applied to the handles and the frictional effects of the deflecting mechanism. Several instruments and methods have been used in measuring the tension in wires and cables. These included the Invar Rule System, a method of measuring the tangents of the wire, and methods involving the principles of sonics. Each of these systems are time consuming, require considerable expenditures in equipment, and are definitely unsuited to mass production techniques.

This invention provides a tension indicator of relatively inexpensive construction that can be used rapidly and efficiently under a variety of lighting conditions and within a minimum space. Accurate indications of tension are produced because both frictional and operator effects are minimized. The indicator comprises a frame having rollers mounted adjacent each end of one side. At least one of the rollers is mounted on a leaf-type spring. A shoe is located between the rollers for deflecting the flexible member against the rollers which in turn deflects the spring from its rest position. Electrical circuitry senses the amount of spring deflection and indicates the amount of tension on an appropriate dial.

For most purposes, especially when measuring the tension in automobile V-belts, an indication that the tension is between predetermined limits is all that is necessary, and the electrical circuitry in indicators intended for such use merely contain a pair of microswitches. The microswitches are connected in series so one switch turns on an electric bulb when a predetermined minimum tension is reached and the other switch turns off the bulb when the tension exceeds a predetermined maximum. In a modified circuit, two bulbs are turned on when the tension is above a predetermined minimum and one of the bulbs turns off if the tension is above a predetermined maximum. An alternative circuit uses strain gages to provide a quantitative tension measurement.

A latching mechanism mounted on one face of the frame locks the shoe in its tensioning position to relieve the necessity of holding the shoe during a tension measurement. The latching mechanism includes a latch block that wedges against a shoe mounting member for locking and is lifted away from the shoe mounting member to release the shoe.

BRIEF DESCRIPTION OF THE DRAWINGS

FIG. 1 is an exploded view of a tension indicator of this invention designed for use with automotive type V-belts. Parts are exploded from both ends, the rear, and the bottom of the indicator frame. FIG. 2 is a front sectional view of the indicator showing the components assembled in place in the frame. FIG. 3 is an exterior view of the front of the indicator in which a V-belt is shown in the deflected position between the shoe and the rollers. FIG. 4 is an exterior view of the rear of the indicator showing the sliding arrangement of the shoe assembly relative to the frame and the locking mechanism for holding the shoe in a position maintaining the tension in the V-belt. FIG. 5 is an end view showing the shape of the shoe assembly and the position of the shoe return spring. FIG. 6 shows the electrical circuitry used in indicators intended to present intelligence showing only that the tension lies between certain values, and FIG. 7 is an alternate electrical circuit in which strain gauges fastened to the leaf spring present a quantitative value of the amount of tension on a meter dial.

DETAILED DESCRIPTION

Referring to FIGS. 1 through 5 generally and FIG. 1 particularly, the tension indicator of this invention comprises a frame 10 that is substantially a rectangular parallelepiped. Frame 10 can be a length of a rectangular box section made of metals such as aluminum, steel, etc., molded plastics such as polyamides, polyurethanes, etc., or fiberglass, and is about four inches long, four inches wide, and one and one-half inches deep. The rear of the frame faces toward the lower right corner in FIG. 1 and the material forming the rear surface 12 preferably has a thickness considerably greater than the material forming the other surfaces.

A shallow channel 14 extends across the width of rear surface 12 at the approximate center thereof and communicates with a shallow bay 16 located on the right side thereof and slightly above the approximate horizontal center line of frame 10. A hammer-shaped channel 18 is formed in surface 12 to the left of channel 14 and at approximately the same horizontal position as bay 16. Two circular studs 20 and 22 project outward from surface 12 with stud 20 located between channel 18 and channel 14 and stud 22 located to the right and slightly below the center portion of bay 16. The metal of surface 12 is completely cut away at the bottom of channel 14 and a pin 23 projects downward from the bottom near the surface of channel 14 and on the approximate center line thereof. Semicircular cutouts 24 and 26 are formed at each end of the top surface of frame 10, and larger square cutouts, one of which is designated by 27, are formed at each end of the bottom surface.

A battery 30 is located inside frame 10 and is held in position by stops 32 and 34. An indicator lamp 36 is fastened to an L-shaped bracket 38 and bracket 38 and stop 34 are fastened to frame 10 by threaded fasteners (not shown). On the other side of battery 30, two microswitches 40 and 42 are fastened to a bracket 44. A second indicator lamp 46 is fastened to an L-shaped bracket 48 and brackets 48 and 44 are fastened to frame 10 by threaded fasteners (not shown).

In a subassembly, a roller 52 is mounted in a U-shaped member 56 that is fastened to one end of a flexible leaf spring 50. Spring 50 is positioned inside frame 10 at the bottom thereof with member 56 located in cutout 27, and a second roller 54 is mounted in a second U-shaped member 58 that is fastened to the other end of spring 50 so it projects through the cutout corresponding to cutout 27. Each roller is free to rotate about its mounting pin 60, 62 and the legs on one side of members 56 and 58 project outward beyond the rollers to serve a guiding function. Two threaded holes 61 and 63 are formed in member 58, and cap screws 65 and 67 are threaded into the holes. Screws 65 and 67 extend through spring 50 and terminate adjacent the actuating levers of microswitches 40 and 42 (see FIG. 2).

An anvil member 64 having a shallow U-shaped cross section with the portion between its projecting legs tapering outwardly to an obtuse knife edge 73 is fasened inside frame 10 just above spring 50 by a pin 66. Spring 50 is positioned between anvil member 64 and the bottom of the frame with a shallow depression 75 in the spring fitting over obtuse knife edge 73 and with rollers 52 and 54 and members 56 and 58 projecting outward beyond the bottom wall (see FIG. 2).

A shoe assembly made up of a shoe 68 and a slide 70 is positioned with the side 70 in channel 14 and the shoe 68 projecting below the bottom of frame 10. Slide 70 has a short groove 72 that fits over a projecting portion of pin 66. A spring 74 slides around pin 23 and bears against shoe 68 to urge the shoe assembly away from the frame 10 to an extended position determined by contact between pin 66 and the upper end of groove 72. Shoe 68 has a semicircular pad 69 on its interior surface, and a backing pad 71 is fastened to the bottom of frame 10 across from pad 69 (see FIG. 2).

Located in bay 16 is a small latching block 76. Block 76 has a nylon pad 78 on one side that is adjacent a plurality of serrations 80 on the edge of slide 70. A latching lever 82 has one end mounted pivotally on stud 22 and extends across rear surface 12 with stud 20 sliding in a groove 86 and a stud 84 on the inner surface of lever 82 fitting into a hole in latching block 76. Stud 84 is located above an imaginary line connecting studs 20 and 22 and an imaginary line connecting stud 84 with stud 22 forms an acute angle therewith. Snap rings 83 and 85 fit on studs 20 and 22 to hold lever 82 in place but permit sliding movement thereof.

To the left of groove 86 is a pin 88 fastened to the inner surface of lever 82 that fits into the handle portion of hammer-shaped channel 18. A compressive spring 90 rests against the upper end of channel 18 and a tack 92 fitting into the other end of spring 90 holds the spring in channel 18 where the head of tack 92 bears on pin 88. End plates 94 and 96 close the ends of frame 10.

Turning to the electrical circuits of FIG. 6, one terminal of battery 30 is connected to microswitch 42 which is connected in series with microswitch 40. Microswitch 40 is normally closed and microswitch 42 is normally open. A lead connects microswitch 40 with the filaments of lamps 36 and 46 which are connected in parallel with each other. The circuit is completed through an appropriate lead or frame 10. In a modification of the FIG. 6 circuit, switches 42 and 40 are in series with lamp 46 only while lamp 36 is in series with switch 42 and in parallel with switch 40 and lamp 46 as represented by the dashed lines. The standard FIG. 6 circuit lights both lamps when tension is within a predetermined range, while the modified circuit lights both lamps when tension is above a predetermined minimum and turns off lamp 46 when tension exceeds a predetermined maximum.

In the quantitative circuit shown in FIG. 7, strain gages represented by numerals 98 and 100 are fastened to opposite sides of leaf spring 50. Battery 30 is connected through strain gage 98 to a terminal 102 and through strain gage 100 to a terminal 104. A variable resistor 106 connects terminal 102 to a terminal 107 and a constant resistance 108 connects terminal 104 to terminal 107. Terminal 107 is connected to the other side of battery 30. A calibrated meter 110 connects terminals 102 and 104.

OPERATION

Spring 90 urges lever 82 toward the bottom of frame 10 to stud 20 contacts the upper end of groove 86. Stud 84 then moves nylon pad 78 of latching block 76 into contact with serrations 80, and the angular relationship of block 76 to stud 22 locks shoe 68 in any position. Pivoting lever 82 clockwise about stud 22 in FIGS. 1 or 4 moves latching block 76 away from serrations 80 and permits spring 74 to move shoe 68 into its extended position. This extended position is determined by contact between pin 66 and the upper end of groove 72.

With shoe 68 thus extended, indicators having the FIG. 6 circuit are calibrated by placing a section of V-belt having a known tension between shoe 68 on one side and rollers 52 and 54 on the other side as shown in FIG. 3. The operator then moves the shoe to its indicating position by squeezing shoe 68 toward the indicator frame, thereby bringing the V-belt into contact with backing pad 71. When the operator releases the shoe, pad 78 of latching block 76 moves into contact with serrations 80 under the force exerted by spring 90 on lever 82 to lock shoe 68 in position.

The tension existing in the deflected portion of the V-belt exerts a force on rollers 52 and 54 and this force deflects the ends of leaf spring 50 inward. Cap screw 67 is turned by an Allen wrench positioned between the V-belt and the frame until a belt having the desired minimum tension actuates switch 42 to light lamps 36 and 46. Similarly, cap screws 65 is adjusted to the position where a predetermined maximum tension opens normally closed microswitch 40 to extinguish lamps 36 and 46.

Lifting lever 82 then disengages latch block 76 from slide 70 and spring 74 moves shoe 68 to its extended position. A V-belt having an unknown tension is placed in the indicator as described above, the shoe 68 is squeezed to its operating position. If the tension is above the calibrated minimum but below the calibrated maximum, spring deflection closes switch 42 but does not open switch 40 so the bulbs 36 and 46 are lighted. If the tension is below the calibrated minimum, switch 42 remains open and the bulbs are not lighted; similarly, if the tension is above the calibrated maximum, switch 40 is opened and the bulbs are not lighted. Thus the belt tension lies between the predetermined limits when the bulbs are on and is outside of the limits when the bulbs are off. Standard ⅜ inch and ½ inch automotive V-belts perform properly with tensions between about 110 and 140 pounds, and an operator with brief experience can sense readily whether the belt tension is above or below this range if the lamps do not light. This permits the use of the standard FIG. 6 circuit with bulbs 36 and 46 at each end of the indicator to facilitate observing bulb lighting with the indicator in a variety of crowded environments.

Where the upper and lower limits are close to each other so confusion might result as to whether the V-belt tension is above or below the range, the modified FIG. 6 circuit is advantageous. This circuit lights both bulbs 36 and 46 when tension is above the calibrated minimum and extinguishes only bulb 46 when tension exceeds the calibrated maximum.

Indicators having the FIG. 7 circuit operate mechanically as described above but provide a quantitative reading of the amount of tension. As spring 50 deflects, the resistances of strain gages 98 and 100 change accordingly. Gages 98 and 100 and resistors 106 and 108 make up a bridge circuit and meter 110 presents a reading proportional to the unbalance of the bridge circuit. The circuit is calibrated initially by variable resistor 106 and meter 110 thereafter presents quantitative values of the tension. In most cases a single strain gage is sufficient, but the double strain gage arrangement shown in FIG. 7 provides a multiplying function. Meter 110 can be mounted in the top surface of the indicator frame or can be located at some remote point.

Where frame 10 is made of a plastic material, a metal slide can be molded into the frame to provide channel 14 and thereby reduce wear. The size of pad 69 varies somewhat with the hardness of the V-belts and must be selected empirically. Pads that are too small indent the soft belts and produce low readings while pads that are too large increase the deflected angle of the belt from the rollers to the pad and thereby produce high readings. Indicators intended for extensive use in a relatively stationary location can be connected to an external power source by forming a socket in member 32 (see FIG. 3).

Thus this invention provides a tension indicator of great versatility and relatively inexpensive construction. The spring and roller construction virtually eliminates any frictional effects that might interfere with accuracy and the latching arrangement eases operator strain during tension measurement without interfering with operating speed.

We claim:

1. A tension indicator for determining the tension in a relatively long flexible member comprising
a frame having rollers positioned adjacent each end of a first side, said frame having a groove in another side that intersects said first side,
a movable shoe means located between said rollers for deflecting the flexible member against said rollers, said shoe means including an L-shaped member having one leg slidable in said groove and the other leg projecting across said first side between said rollers, said other leg being movable into contact with said flexible member to deflect the length of the flexible member between the rollers, said shoe means being spring loaded in a direction moving said other leg away from the frame to an open position,
latch means for holding the shoe means in a closed position, said latch means including a lever pivotally mounted on said frame and a latch block operably connected to said lever, said latch block being located adjacent the first mentioned leg of the L-shaped member and being movable into wedging contact therewith to hold the shoe means in a closed position, spring means loading at least one of said rollers against the flexible member, said spring means deflecting under the force exerted on the roller by the deflection of the flexible member, and
electrical circuitry actuated by the deflection of said spring means for indicating the tension in said flexible member.

2. The indicator of claim 1 in which the frame is substantially a rectangular parallelepiped and the L-shaped member has a longer leg slidable in said groove and a shorter leg projecting across said first side of the frame.

3. The indicator of claim 2 in which the latch block is located at an acute angle from the pivot of said lever, said angle being in the direction of the closed position of the L-shaped member, said latch block being spring loaded into contact with the L-shaped member.

4. The indicator of claim 3 in which the latch block has a nylon pad on its surface adjacent said longer leg of the L-shaped member and the adjacent surface of the longer leg is serrated.

5. The indicator of claim 4 in which the electrical circuitry comprises a first switch electrically connected to a first light bulb, said first switch being normally open and closing upon a predetermined deflection of said spring means to turn on said first bulb, and a second switch electrically in series with said first switch, said second switch being normally closed and opening upon a greater amount of deflection of the spring means to turn off the light bulb.

6. The indicator of claim 5 comprising a second light bulb connected in parallel with said normally closed switch and said first bulb, said second bulb turning on whenever deflection of said spring means exceeds a predetermined minimum.

7. The indicator of claim 4 in which the electrical circuitry comprises a strain gauge fastened to the spring means and means electrically connected to said strain gauge for providing a quantitative reading of the amount of deflection of said spring means.

8. The indicator of claim 1 in which the electrical circuitry comprises a first switch electrically connected to a light bulb, said first switch being normally open and closing upon a predetermined deflection of said spring means to turn on said first bulb, and a second switch electrically in series with said first switch, said second switch being normally closed and opening upon a greater amount of deflection of the spring means to turn off the light bulb.

9. The indicator of claim 1 in which the electrical circuitry comprises a strain gauge fastened to the spring means and means electrically connected to said strain gauge for providing a quantitative reading of the amount of deflection of said spring means.

References Cited

UNITED STATES PATENTS

| | | | |
|---|---|---|---|
| 2,452,302 | 10/1948 | Hitchen | 73—144 |
| 2,795,136 | 6/1957 | Matt | 73—144 |
| 3,398,575 | 8/1968 | Saxl | 73—144 |
| 3,343,008 | 9/1967 | Bancroft | 307—119 |
| 3,135,342 | 6/1964 | Harmes | 177—48 |
| 2,433,585 | 12/1947 | Warner | 177—311 |
| 2,368,757 | 2/1945 | Graham | 73—144 |
| 2,250,941 | 7/1941 | Zimmerman | 81—52.5 |
| 1,469,280 | 10/1923 | Stahl | 73—144 |

RICHARD C. QUEISSER, Primary Examiner

J. WHALEN, Assistant Examiner

U.S. Cl. X.R.

340—379